(12) United States Patent
Zhang et al.

(10) Patent No.: US 11,354,887 B2
(45) Date of Patent: Jun. 7, 2022

(54) COIN IDENTIFICATION METHOD, DEVICE, AND CASH REGISTER

(71) Applicant: Beijing Baidu Netcom Science and Technology Co., Ltd., Beijing (CN)

(72) Inventors: Jiadong Zhang, Beijing (CN); Guoyi Liu, Beijing (CN); Chao Li, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 301 days.

(21) Appl. No.: 16/825,222

(22) Filed: Mar. 20, 2020

(65) Prior Publication Data

US 2021/0089810 A1 Mar. 25, 2021

(30) Foreign Application Priority Data

Sep. 20, 2019 (CN) .......................... 201910896837.1

(51) Int. Cl.
| | |
|---|---|
| *G06N 20/00* | (2019.01) |
| *G06N 5/04* | (2006.01) |
| *G06V 10/75* | (2022.01) |
| *G07G 1/00* | (2006.01) |

(52) U.S. Cl.
CPC ............. *G06V 10/751* (2022.01); *G06N 5/04* (2013.01); *G06N 20/00* (2019.01); *G07G 1/00* (2013.01)

(58) Field of Classification Search
None
See application file for complete search history.

(56) References Cited

FOREIGN PATENT DOCUMENTS

| | | |
|---|---|---|
| CN | 101819692 A | 9/2010 |
| CN | 101872502 A | 10/2010 |
| CN | 102034108 A | 4/2011 |
| CN | 105354943 A | 2/2016 |
| CN | 106485230 A | 3/2017 |
| CN | 206133685 U | 4/2017 |
| CN | 107195069 A | 9/2017 |
| CN | 107392191 A | 11/2017 |
| CN | 107958531 A | 4/2018 |
| CN | 108734850 A | 11/2018 |
| CN | 109785499 A | 5/2019 |
| CN | 109906473 A | 6/2019 |
| CN | 109961296 A | 7/2019 |
| CN | 107690660 B * | 3/2021 ........... G06K 9/6277 |
| IN | 201841023942 A | 7/2018 |

\* cited by examiner

*Primary Examiner* — Dov Popovici
(74) *Attorney, Agent, or Firm* — Benesch, Friedlander, Coplan & Aronoff LLP (57) ABSTRACT

A coin identification method and device, as well as a coin register are provided, which are related to a field of image identification. A specific implementation includes: extracting, from a to-be-identified image including coins, image blocks corresponding to the coins, to form an input coin set; inputting the input coin set into a coin classification model, to obtain categories and a classification confidences of the image blocks of the coins in the input coin set, wherein the category includes a face value of the coin; incorporating an image block, with a classification confidence reaching a threshold, of a coin of the input coin set into a first coin set; and determining a face value indicated by a category of the image block of the coin in the first coin set as a final face value of the coin in the first coin set.

20 Claims, 5 Drawing Sheets

COIN IDENTIFICATION METHOD, DEVICE, AND CASH REGISTER

CROSS-REFERENCE TO RELATED APPLICATION

This application claims priority to Chinese patent application No. 201910896837.1, filed on Sep. 20, 2019 and entitled "Coin Identification Method, Device, and Cash Register", which is hereby incorporated by reference in its entirety.

TECHNICAL FIELD

The present application relates to a field of image identification, and in particular, to a field of a coin identification.

BACKGROUND

There are usually two application scenarios for payment with coins. In one scenario, a salesperson performs a settlement manually. In the other scenario, a user buys goods by inserting a coin into a vending machine. Counting of coins by a salesperson in a self-service supermarket is obviously a waste in labor costs. In addition, in a case that a slot-machine system identical with the vending machine is added to an unmanned counter, on the one hand, a less type of coin currencies is supported (generally a face value such as 1 Euro, 10 cents and the like); on the other hand, the coins need to be inserted one by one, rendering a relative long time for payment.

SUMMARY

A coin identification method and device are provided according to embodiments of the present application, to solve at least the above technical problems in the existing technology.

According to a first aspect, a coin identification method is provided in an embodiment of the application, the method including:

extracting, from a to-be-identified image comprising coins, image blocks corresponding to the coins, to form an input coin set;

inputting the input coin set into a coin classification model, to obtain categories and a classification confidences of the image blocks of the coins in the input coin set, wherein the category comprises a face value of the coin;

incorporating an image block, with a classification confidence reaching a threshold, of a coin of the input coin set into a first coin set; and determining a face value indicated by a category of the image block of the coin in the first coin set as a final face value of the coin in the first coin set.

In the embodiment of the present application, the face values of a large number of coins can be determined at the same time, which overcomes technical problems of a waste in labor costs by manually counting coins, less categories of the coins supported by a coin system, and a long time for inserting coins, thereby achieving technical effects of no human intervention, a short identification time, and a determination of a large number of coin at the same time.

In an implementation, the coin identification method further includes:

incorporating an image block, except the image block of the coin of the first coin set, of the coin of the input coin set into a second coin set:

acquiring an appearance feature for each face value of coins in the first coin set; and for each coin to be identified in the second coin set, comparing the image block of the coin in the second coin set with the appearance feature for each face value of coins in the first coin set, to determine a final face value of the coin in the second coin set.

In the embodiment of the present application, for an image block of a coin that cannot be identified by the classification model, the appearance feature of the coin to be identified can be compared with that of the image blocks of coins of which categories have already been identified, to determine the final face value of the coin, so that a technical problem of a low identification accuracy is overcome, thereby achieving the effect of a high identification accuracy.

In an implementation, the category further includes an upward side; the incorporating an image block, with a classification confidence reaching a threshold, of a coin of the input coin set into a first coin set includes:

incorporating an image block of a coin with a first upward side of the input coin set into the first coin set, wherein the image block of the first coin set has the classification confidence reaching the threshold.

In the embodiment of the present application, an effect of a high identification accuracy is achieved according to the classification and setting of a threshold. As the coin identification technology based on deep learning is applied, the technical problem of a low identification accuracy is overcome, thereby achieving the effect of a high identification accuracy.

In an implementation, the appearance feature includes information on a diameter and/or a color, and the for each coin to be identified in the second coin set, comparing the image block of the coin in the second coin set with the appearance feature for each face value of coins in the first coin set, to determine a final face value of the coin in the second coin set, comprises at least one of methods as follows:

for an image block of each coin to be identified with the first upward side in the second coin set, determining a face value of an image block of a coin, having a diameter difference with the image block of the coin to be identified less than a first threshold, in the first coin set; and/or determining a face value of an image block of a coin, having a color difference with the image block of the coin to be identified less than a second threshold; and determining the face value as the final face value of the coin to be identified; and for an image block of each coin to be identified having a second upward side in the second coin set, determining a first face value of an image block having a diameter difference with the image block of the coin to be identified less than a third threshold, in the first coin set; and a second face value of an image block having a color difference with the image block of the coin to be identified less than a fourth threshold, in the first coin set; and if the first face value is equal to the second face value, determining the first face value as the final face value of the coin to be identified.

In the embodiment of the present application, the accuracy of the face value determination can be increased by using the information on a diameter and/or a color of the coin. As the identification technology is applied based on the information on a diameter and/or a color of the coin, the technical problem of a low identification accuracy is overcome, thereby achieving the effect of a high identification accuracy.

In an implementation, the extracting, from a to-be-identified image comprising coins, image blocks corresponding to the coins, to form an input coin set comprises:

extracting n image blocks from the to-be-identified image comprising n coins, to form the input coin set, wherein one image block corresponds to one coin in the to-be-identified image, and n is a positive integer.

In the embodiment of the present application, a large number of coins can be determined at the same time in a very short time. As the coin identification technology based on deep learning is applied, the technical problem of the waste in labor costs and slow counting of coins by manual counting coins is overcome, thereby achieving the technical effect of simultaneously identifying and determining a large number of coins in a short time.

In an implementation, the coin identification method further includes: training a coin detection model by using a target detection model, the extracting n image blocks from the to-be-identified image comprising n coins comprises:

inputting the to-be-identified image into the coin detection model, and detecting positions of multiple detection frames and a confidence for each detection frame comprising a coin;

according to the positions of multiple detection frames and the confidence for each detection frame comprising a coin, acquiring positions of n detection frames, each of which is determined to comprise a coin; and extracting n image blocks from the to-be-identified image according to the positions of the n detection frames.

In the embodiment of the present application, a large number of coins can be determined at the same time in a very short time. As the coin identification technology based on deep learning is applied, the technical problem of the waste in labor costs and slow counting of coins by manual counting coins is overcome, thereby achieving the technical effect of simultaneously identifying and determining a large number of coins in a short time.

In an implementation, the coin identification method further includes: performing ellipse fitting on a detection frame for each coin, to acquire an ellipse detection frame; and calculating a diameter of the ellipse detection frame as information on a diameter of the coin, and/or a color average in the ellipse detection frame as information on a color of the coin.

In the embodiment of the present application, a large number of coins can be determined at the same time in a very short time. As the coin identification technology based on deep learning is applied, the technical problem of the waste in labor costs and slow counting of coins by manual counting coins is overcome, thereby achieving the technical effect of simultaneously identifying and determining a large number of coins in a short time.

In an implementation, the acquiring an appearance feature for each face value of coins in the first coin set includes: calculating a diameter average and/or a color average of one or more coins for each face value in the first coin set as information on a diameter and/or a color corresponding to the face value.

In the embodiment of the present application, the accuracy of the face value determination can be increased by using the diameter and/or color average of the coin. As the identification technology is applied based on the diameter and/or color average of the coin, the technical problem of a low identification accuracy is overcome, thereby achieving the effect of a high identification accuracy.

In an implementation, the coin identification method further includes: according to the final face value of each of the coins in the input coin set, determining a total face value and/or a number of all coins in the input coin set by statistics.

In the embodiment of the present application, the total face value and/or number of the identified coins is determined to increase a settlement speed and simplify a settlement difficulty.

In an implementation, the coin identification method further includes: outputting information of the coins in an image form; wherein the information of the coins comprises at least one of a position of each coin, a face value of each coin, a classification confidence of each coin, a total face value of the coins, and a number of the coins.

In the embodiment of the present application, specific information for the coins can be visually displayed. As the coin identification technology based on deep learning is applied, the technical problem of the waste in labor costs and slow counting of coins by manual counting coins is overcome, thereby achieving the technical effect of displaying specific information of coins in a short time.

According to a second aspect, a coin identification device is provided in an embodiment of the application, the device including:

a detecting module configured to extract, from a to-be-identified image comprising coins, image blocks corresponding to the coins, to form an input coin set:

a classifying module configured to input the input coin set into a coin classification model, to obtain categories and a classification confidences of the image blocks of the coins in the input coin set, wherein the category comprises a face value of the coin; and a determining module configured to incorporate an image block, with a classification confidence reaching a threshold, of a coin of the input coin set into a first coin set; and determine a face value indicated by a category of the image block of the coin in the first coin set as a final face value of the coin in the first coin set.

In an implementation, the coin identification device further includes:

an appearance feature acquiring module configured to acquire an appearance feature for each face value of coins in the first coin set;

wherein the determining module is further configured to, for each coin to be identified in the second coin set, compare the image block of the coin in the second coin set with the appearance feature for each face value of coins in the first coin set, to determine a final face value of the coin in the second coin set.

In an implementation, the category further includes an upward side; and the determining module is further configured to incorporate an image block of a coin with a first upward side of the input coin set into the first coin set, wherein the image block of the first coin set has the classification confidence reaching the threshold.

In an implementation, the appearance feature comprises information on a diameter and/or a color, and the determining module comprises at least one of:

a first determining sub-module configured to, for an image block of each coin to be identified with the first upward side in the second coin set, determine a face value of an image block of a coin, having a diameter difference with the image block of the coin to be identified less than a first threshold, in the first coin set; and/or determine a face value of an image block of a coin, having a color difference with the image block of the coin to be identified less than a second threshold; and determine the face value as the final face value of the coin to be identified; and a second determining sub-module configured to, for an image block of each coin to be identified having a second upward side in the second coin set, determine a first face value of an image block having a diameter difference with the image block of the coin to be identified less than a third threshold, in the first coin set; and a second face value of an image block having a color difference with the image block of the coin to be identified less than a fourth threshold, in the first coin set; and if the first face value is equal to the second face value, determine the first face value as the final face value of the coin to be identified.

In an implementation, the detecting module is further configured to: extract n image blocks from the to-be-identified image comprising n coins, to form the input coin set, wherein one image block corresponds to one coin in the to-be-identified image, and n is a positive integer.

In an implementation, the coin identification device further includes:

a training module configured to train a coin detection model by using a target detection model;

wherein the detecting module is further configured to input the to-be-identified image into the coin detection model, and detect positions of multiple detection frames and a confidence for each detection frame comprising a coin, and according to the positions of multiple detection frames and the confidence for each detection frame comprising a coin, acquire positions of n detection frames, each of which is determined to comprise a coin; and extract n image blocks from the to-be-identified image according to the positions of the n detection frames.

In an implementation, the appearance feature acquiring module is configured to perform ellipse fitting on a detection frame for each coin, to acquire an ellipse detection frame; and calculate a diameter of the ellipse detection frame as information on a diameter of the coin, and/or a color average in the ellipse detection frame as information on a color of the coin.

In an implementation, the appearance feature acquiring module is configured to calculate a diameter average and/or a color average of one or more coins for each face value in the first coin set as information on a diameter and/or a color corresponding to the face value.

In an implementation, the coin identification device further includes: a statistics module configured to, according to the final face value of each of the coins in the input coin set, determine a total face value and/or a number of all coins in the input coin set by statistics.

In an implementation, the coin identification device further includes: an outputting module configured to output information of the coins in an image form; wherein the information of the coins comprises at least one of a position of each coin, a face value of each coin, a classification confidence of each coin, a total face value of the coins, and a number of the coins.

According to a third aspect, a coin identification apparatus is provided in an embodiment of the application, includes:

at least one processor; and a memory communicated with the at least one processor; wherein, wherein instructions executable by the at least one processor is stored in the memory, and the instructions are executed by the at least one processor to enable the at least one processor to implement the method provided by any one of the embodiments of the present application.

According to a fourth aspect, a non-transitory computer-readable storage medium is provided in an embodiment of the application, in which instructions of a computer are stored, wherein the instructions are configured to enable the computer to implement the method provided by any one of the embodiments of the present application.

According to a fifth aspect, a cash register is provided in an embodiment of the application, includes:

a coin receiving device configured to receive inserted coins;

an image collector configured to acquire a to-be-identified image including n coins inserted; and a coin identification device including: at least one processor; and a memory communicated with the at least one processor; instructions executable by the at least one processor is stored in the memory, and the instructions are executed by the at least one processor to enable the at least one processor to implement the method provided by any one of the embodiments of the present application.

One embodiment in the above application has the following advantages or beneficial effects. An effect of a high identification accuracy is achieved in a fixed scenario of a checkout counter. Manual counting by the salesperson is not required in the process, and at the same time, full currency identification is also supported. Further, a large number of coins can be determined at the same time in a very short time. It can be applied to or embedded in the cash register system of the self-service supermarket or the vending machine to cover coin-level payment scenarios for the user. As the coin identification technology based on deep learning is applied, technical problems are overcome, such as the waste in labor costs due to manual counting of coins, less categories of the coins being supported by the slot system, and a long time for inserting coins, thereby achieving an effect of a high identification accuracy, supporting full currency identification without manual operations, a short identification time, and determining a large number of coins at the same time in a very short time.

Other effects of the foregoing optional manners will be described below in conjunction with specific embodiments.

BRIEF DESCRIPTION OF THE DRAWINGS

The drawings are used to better understand the solution and are not to be considered as limiting the present application.

DETAILED DESCRIPTION OF THE EMBODIMENTS

With reference to the accompanying drawings, exemplary embodiments of the present application are described below, which include various details of the embodiments of the present application to facilitate understanding and should be considered as merely exemplary. Therefore, those of ordinary skill in the art should recognize that various changes and modifications can be made to the embodiments described herein without departing from the scope and spirit of the application. Also, for clarity and conciseness, descriptions for public knowledge of functions and structures are omitted in the following descriptions.

Figure 1:
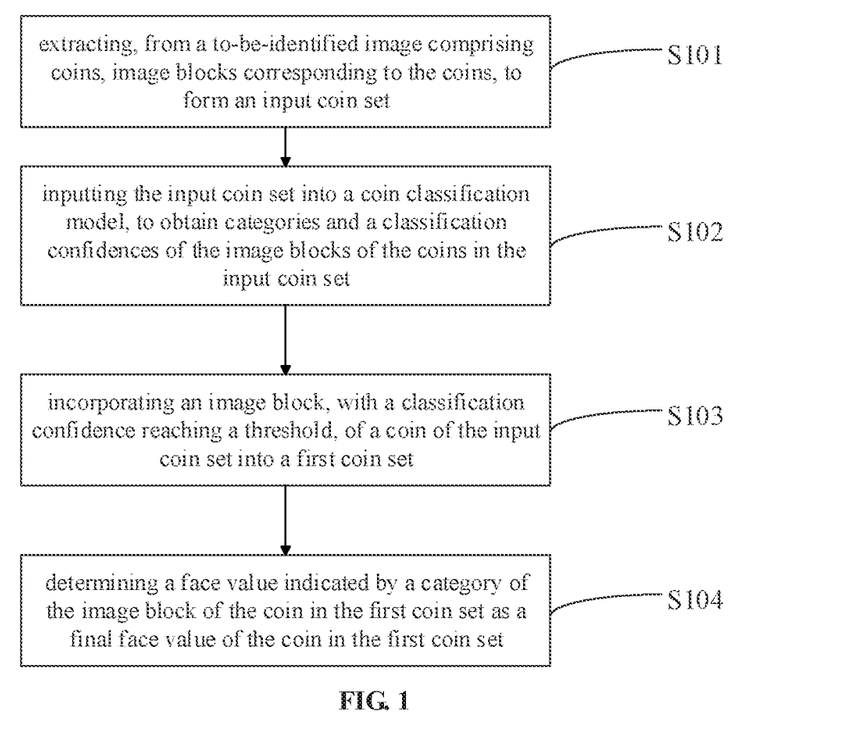
FIG. 1 is a schematic flowchart of a coin identification method according to an embodiment of the present application.

FIG. 1 is a schematic flowchart of a coin identification method according to an embodiment of the present application. The method includes the following steps from S101 to S104.

S101, extracting, from a to-be-identified image comprising coins, image blocks corresponding to the coins, to form an input coin set.

The to-be-identified image may include multiple coins, and each coin corresponds to one image block. Detection may be performed to the to-be-identified image by using one of target detection models such as SSD, fasterRcnn, yolo, and the like. The image block corresponding to each coin can be extracted from the to-be-identified image to form the input coin set.

S102, inputting the input coin set into a coin classification model, to obtain categories and classification confidences of the image blocks of the coins in the input coin set, wherein the category comprises a face value of the coin.

The coins in the input coin set are classified by using the coin classification model, wherein a classification training can be performed by using a common image classification model, for the coin classification model.

One of deep learning networks such as resnet, googlenet and the like can be used as the image classification model. For example, there are 8 face values of Euro coins: 1 cent, 2 cents, 5 cents, 10 cents, 20 cents, 50 cents, 1 Euro, and 2 Euro. Front sides of Euro coins are identical for different countries in the euro zone. However, there are different patterns on the back side of the coins for different countries (1 cent, 2 cents, 5 cents may have an identical pattern on the back side, and 10 cent, 20 cents, 50 cents may have an identical pattern on the back side). Therefore, coins can be classified into 12 categories according to the front side, the back side, a color, and a face value, that is, the back side of 1 cent, 2 cents, or 5 cents; the back side of 10 cents, 20 cents, or 50 cents; the back side of 1 Euro; the back side of 2 Euro; and the front sides of 8 face values. Large amount of training data (including coins at different rotation angles, for different countries, at different light brightness, in different backgrounds, and the like) is collected for these 12 categories, and a classifier is trained based on the training data by using the common image classification model to generate the coin classification model.

After the coin classification model is generated, the category and the classification confidence can be determined for the acquired image block of each coin in the input coin set. The category at least includes the face value, such as 1 cent, 5 cents, 10 cents, and the like. The classification confidence is a probability of classification prediction, such as, the probability that the image block corresponds to a face value (1 cent, 5 cents, and 10 cents).

In an embodiment, a coin image collected in actual applications can be added to the training data to adjust the weight of the data collected in the actual applications in the training data, and then the classifier is retrained to improve an accuracy of the model.

Optionally, the classification model may be stored in a remote server, or the image of each acquired coin in the input coin set may be transmitted to the server end, and the category and the classification confidence thereof may be determined by the server end.

S103, incorporating an image block, with a classification confidence reaching a threshold, of a coin of the input coin set into a first coin set. The threshold may be set in advance. For example, the threshold is set to 0.8. When the classification confidence of an image block reaches 0.8, the image block is incorporated into the first coin set. A higher classification confidence indicates that a probability that image block of the coin belongs to the category is high. The first coin set includes the image blocks of coins, categories of which have been successfully identified.

S104, determining a face value indicated by a category of the image block of the coin in the first coin set as a final face value of the coin in the first coin set.

For example, each category corresponds to a face value. As the category of each image block included in the first coin set has a high confidence, the face value indicated by the category of the image block of the coin in the first coin set can be taken as the final face value of the coin in the first coin set.

In the embodiment of the present application, the coin is identified based on deep learning. According to the classification model, face values of a large number of coins can be determined at the same time, which overcomes technical problems of the waste in labor costs by manually counting coins, less categories of the coins supported by a coin system, and the long time for inserting coins. Therefore, the technical effects of no human intervention, a short identification time, and the determining of a large number of coins at the same time.

In an embodiment, the coin identification method further includes: incorporating an image block, except the image block of the coin of the first coin set, of the coin of the input coin set into a second coin set; acquiring an appearance feature for each face value of coins in the first coin set; and for each coin to be identified in the second coin set, comparing the image block of the coin in the second coin set with the appearance feature for each face value of coins in the first coin set, to determine a final face value of the coin in the second coin set.

After S103, the image block of a coin which is not incorporated in the first coin set may be incorporated into the second coin set. As the confidence of the category of the image block included in the second coin set is low, it can be considered that the category of the image block is not identified.

For example, a diameter average and/or a color average of one or more coins of each face value in the first coin set is calculated as the information on a diameter and/or color corresponding to the face value.

The appearance feature may include the information on a diameter and/or a color. For each face value of the coins in the first coin set, the information on a diameter and/or a color corresponding to the face value is calculated. For all coins with each face value, the diameter average and/or color average of these coins can be calculated as the information on a diameter and/or a color corresponding to the face value. For example, by using an image detection and processing technology, a detection frame for a coin is slightly expanded outward (to ensure that the entire coin is inside the frame).

The detection frame can be fit by using a foreground extraction in opencv and a fitEllipse method of adding. An ellipse in the detection frame is fit to calculate the diameter of the coin. At the same time, the color average in the entire ellipse can be extracted by using opencv.

In an embodiment, for each face value of the coins in the first coin set, texture information for the face value can also be acquired according to the extracted image block of each coin, and a texture feature in entire inner ellipse can be extracted by using opencv.

For example, each category corresponds to a face value. The appearance feature for each face value of coins includes the information on a diameter and/or a color. The final face value of a coin in the second coin set is determined through comparing the information on a diameter and/or a color of the image block of the coin in the second coin set with that in the first coin set.

For example, the diameter of the image block A of a certain coin to be identified in the second coin set is compared with that of the image block of each coin in the first coin set. In a case that the difference between the diameter of the image block A and that of the image block B in the first coin set is less than a set threshold, the face value for the image block B is determined as the face value for the image block A.

For another example, the color information of the image block C of a certain coin to be identified in the second coin set is compared with that of each coin in the first coin set. In a case that the difference between the color information of the image block C and that of the image block D in the first coin set is less than the set threshold, the face value for the image block D is determined as the face value for the image block C.

For another example, respective differences between the diameter of the image block A in the second coin set and those of respective image blocks B, C, and D in the first coin set are all less than the set threshold. Moreover, respective differences between the color information of the image block A and those of respective image blocks C, E, and F in the first coin set are less than the set threshold. Based on compared results in the diameter and color information, the face value for the image block C is determined as the face value for the image block A.

For another example, the difference of the diameter and color information between the image block of each coin with a first upward side in the second coin set and the image block of each coin in the first coin set is normalized. In a case that a normalized difference is less than the threshold set in advance, it is determined that the face value of the coin in the second coin set is the face value of the coin, corresponding to the normalized difference, in the first coin set.

Optionally, the texture information of the image blocks of the coins in the first coin set may also be compared with that in the second coin set to determine the final face value of each coin in the second coin set. For example, a similarity of the texture information between the image block of a coin to be identified in the second coin set and the image block of each coin in the first coin set is calculated, and the face value for the image block of the coin, with the similarity is greater than the set threshold, in the first coin set is determined as the face value for the coin to be identified.

In an embodiment, for each coin to be identified in the second coin set, an appearance feature of the image block of the coin to be identified in the second coin set is compared with that of each face value of coins in the first coin set, to determine the final face value of the coin to be identified in the second coin set. Each time the final face value of a certain coin in the second coin set is obtained, the coin can be removed from the second coin set and incorporated into the first coin set until neither the first coin set nor the second coin set is updated. At this time, in a case that there are still a coin in the second coin set that has not yet been determined, information of failing to determine is returned. In a case that the second coin set is empty, the final face value determining is completed.

Optionally, a machine learning K-means clustering algorithm may be used to normalize information on a diameter, a color, and a texture, and the like for an image block of a coin in the second coin set, and a cluster calculation is performed to obtain cluster information for the image block of the coin in the second coin set. By comparing a center value of the cluster information with that for an image block of each face value of coins in the first coin set, a face value in the first coin set with the closest center value is determined as the face value of the coin in the second coin set.

In the embodiment of the present application, for the image blocks of the coins that cannot be identified by the classification model, the appearance of a coin to be identified can be compared with that of the image blocks of coins of which categories have already been identified to determine the final face value of the coin to be identified, so that a technical problem of a low identification accuracy is overcome, thereby achieving the effect of a high identification accuracy.

In an embodiment, the coin identification method may further include: according to the final face value of each of the coins in the input coin set, determining a total face value and/or a number of all coins in the input coin set by statistics. The total face value and/or number of the identified coins is determined to increase a settlement speed and simplify a settlement difficulty.

In an embodiment, the coin identification method may further include: outputting information of the coins in an image form. The information of the coins includes at least one of a position of each coin, a face value of each coin, a classification confidence of each coin, a total face value of the coins, and a number of the coins. Specific information for each of the coins can be visually displayed. As the coin identification technology based on deep learning is applied, the technical problem of the waste in labor costs and slow counting of coins by manual counting coins is overcome, thereby achieving the technical effect of displaying specific information of each of the coins in a short time.

Optionally, the total face value of the coins is provided in the form of a sound and whether the settlement is successful is also provided.

In an embodiment, the category further includes an upward side, and the upward side can be the front side or back side of the coin. In S103, the image block with a first upward side (for example, the front side is the upward side) of a coin in the input coin set can be incorporated into the first coin set, wherein the image block of the first coin set has the classification confidence reaching the threshold (for example, 0.8). The face value indicated by the category of the image block of each coin in the first coin set is determined as the final face value of the coin. Further, the final face value of each coin to be identified in the second coin set is acquired by using the appearance feature of the image block of each coin in the first coin set. Finally, the total face value of the coins in the to-be-identified image is acquired.

Optionally, a search service may also be used to search a face value of coins in a database that is the most similar in the information on a diameter and/or a color with the image block of the coin in the second coin set, and this face value is determined as the final face value of the coin.

In an embodiment, the category includes the face value and the upward side, and S103 may further include: incorporating an image block of a coin with a first upward side (such as the front side) of the input coin set into the first coin set, wherein the image block of the first coin set has the classification confidence reaching the threshold (such as 0.8). Specific embodiments for determining the final face value of the coins in the second coin set include at least one of the methods as follows.

A method 1 may include: for an image block of each coin to be identified with the first upward side in the second coin set, determining a face value of an image block of a coin, having a diameter difference with the image block of the coin to be identified less than a first threshold, in the first coin set; and/or determining a face value of an image block of a coin, having a color difference with the image block of the coin to be identified less than a second threshold; and determining the face value as the final face value of the coin to be identified.

A method 2 may include: for an image block of each coin to be identified having a second upward side in the second coin set, determining a first face value of an image block having a diameter difference with the image block of the coin to be identified less than a third threshold, in the first coin set; and a second face value of an image block having a color difference with the image block of the coin to be identified less than a fourth threshold, in the first coin set; and if the first face value is equal to the second face value, determining the first face value as the final face value of the coin to be identified.

Figure 2:
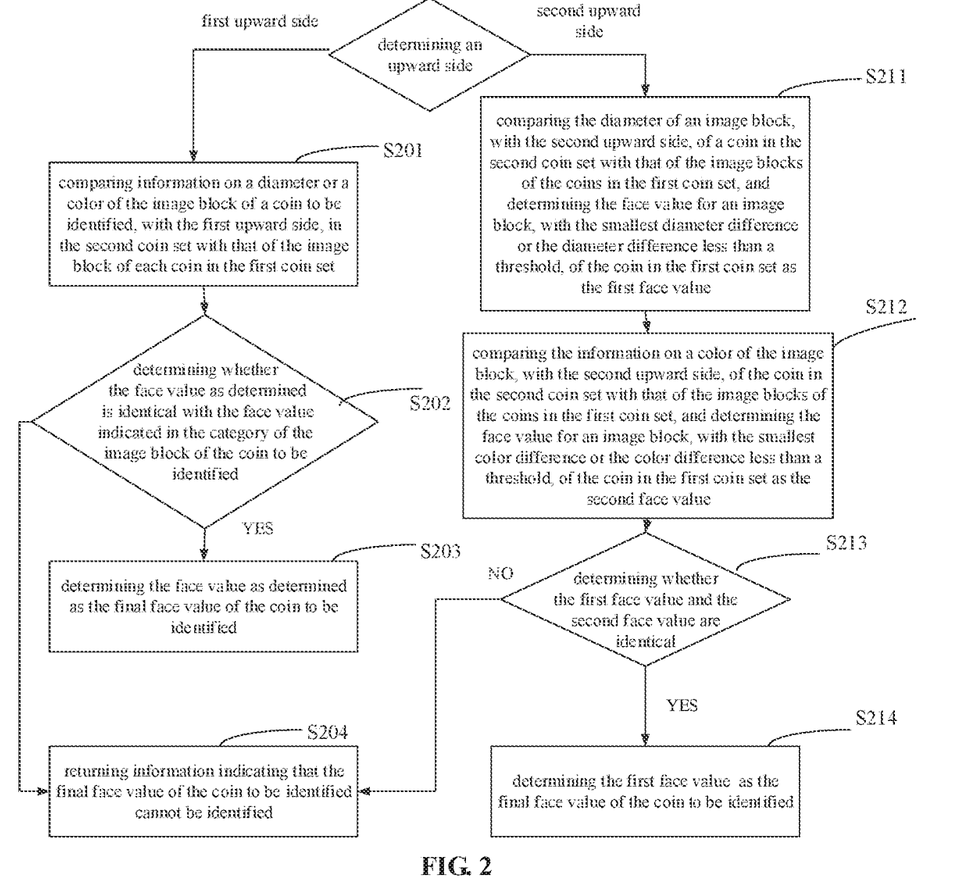
FIG. 2 is a flowchart of a specific implementation of determining a face value of a coin in a second coin set in the embodiment shown in FIG. 1.

As shown in FIG. 2, it is a flowchart of a specific embodiment for determining a final face value of coins in a second coin set. Firstly, the upward sides of the image blocks of the coins in the second coin set are determined. In the case of a first upward side, S201 is performed, and in the case of a second upward side, S211 or S212 is performed.

In S201, information on a diameter or a color of the image block of a coin to be identified, with the first upward side (e.g. the front side), in the second coin set is compared with that of the image block of each coin in the first coin set.

For example, the difference between the diameter of the image block A of the coin to be identified in the second coin set and that of the image block B of the first coin set is the smallest or less than the first threshold, and the difference between the information on a color of the image block A and that of the image block B in the first coin set is the smallest or less than the second threshold. The face value of the image block B is determined as the face value of the image block A.

Optionally, the texture information of the image blocks of the coins in the first coin set may also be compared with that of the image blocks of the coins in the second coin set to determine the final face value of the coins in the second coin set.

In S202, it is determined whether the face value determined in S201 is identical with the face value indicated in the category of the image block of the coin to be identified (the category in S102). In a case of being identical, S203 is performed, and in a case of being not identical, S204 is performed.

In S203, the face value determined in S201 is determined as the final face value of the coin to be identified.

In S204, information indicating that the final face value of the coin to be identified cannot be identified is returned.

Then, the identification of the coin to be identified may be ended, and other coins to be identified in the second coin set may be identified.

In S211, the diameter of an image block, with the second upward side, of a coin in the second coin set is compared with that of the image blocks of the coins in the first coin set, and the face value for an image block, with the smallest diameter difference or the diameter difference less than a threshold, of the coin in the first coin set is determined as the first face value.

In S212, the information on a color of the image block, with the second upward side, of the coin in the second coin set is compared with that of the image blocks of the coins in the first coin set, and the face value for an image block, with the smallest color difference or the color difference less than a threshold, of the coin in the first coin set is determined as the second face value. The execution sequence of S211 and S212 can be interchanged or performed in parallel.

In S213, it is determined whether the first face value and the second face value are identical. In a case of being identical, S214 is performed, and in a case of being not identical, S204 is performed.

In S214, the first face value is determined as the final face value of the coin to be identified.

In an implementation, the texture information may also be added to determine a third face value for the image block, having a similarity greater than a set threshold, of a coin to be identified in the second coin set with that of an image block of a coin in the first coin set. Based on the first face value and the second face value, it is determine whether the first face value, the second face value, and the third face value are identical. In a case of being identical, the first face value is determined as the final face value of the coin to be identified.

In the embodiment of the present application, the accuracy of the face value determination can be increased by using the information on a diameter and/or a color of the coin. As the identification technology is applied based on the information on a diameter and/or a color of the coin, the technical problem of a low identification accuracy is overcome, thereby achieving the effect of a high identification accuracy.

Figure 3:
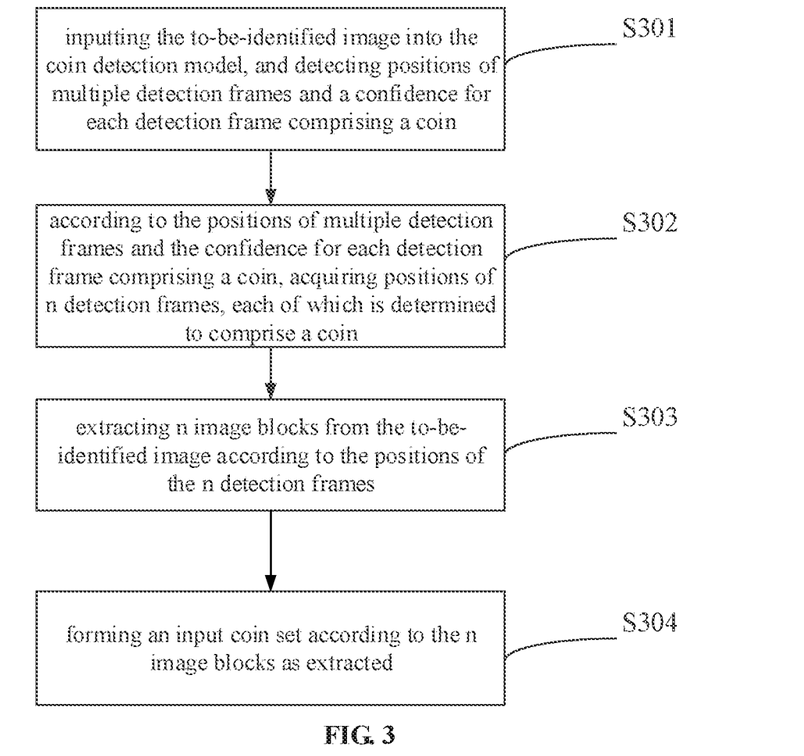
FIG. 3 is a schematic flowchart of generating a coin set according to an embodiment of the present application.

FIG. 3 is a schematic flowchart of generating a coin set according to an embodiment of the present application. The coin identification method may further include: training a coin detection model by using a target detection model. The target detection model can be one of SSD, fasterRcnn, yolo, and the like. The training data can use different face values and different types of coins.

In S101, n image blocks may be extracted from the to-be-identified image comprising n coins, to form the input coin set, wherein one image block corresponds to one coin in the to-be-identified image, and n is a positive integer. The extracting of n image blocks from the to-be-identified image including n coins includes the following steps from S301 to S304.

S301, inputting the to-be-identified image into the coin detection model, and detecting positions of multiple detection frames and a confidence for each detection frame comprising a coin. The positions of the coins in the image can be detected by using the coin detection model. A square or rectangular detection frame can be used to mark a position of a coin. In a case that two coins are located next to each other, the square or rectangular detection frame may be overlapped. The coin detection model can also output the confidence that each detection frame includes a coin. For example, in a case that the confidence that a certain detection frame includes a coin is 0.9, which is greater than a set threshold, it can be determined that a coin image is included in the detection frame.

S302, according to the positions of multiple detection frames and the confidence for each detection frame comprising a coin, acquiring positions of n detection frames, each of which is determined to comprise a coin.

S303, extracting n image blocks from the to-be-identified image according to the positions of the n detection frames.

S304, forming an input coin set according to the n image blocks as extracted. Each image block corresponds to one coin in the image, and n image blocks, to form the input coin set.

In an embodiment, the coin identification method further includes: performing ellipse fitting on a detection frame for each coin, to acquire an ellipse detection frame; and calculating a diameter of the ellipse detection frame as information on a diameter of the coin, and/or a color average in the ellipse detection frame as information on a color of the coin. For example, the length of the long axis of the ellipse detection frame is determined as the diameter of the coin included in the ellipse detection frame. For another example, a plurality of pixel points are selected from the ellipse detection frame, and the color average of the selected pixel points is calculated as the information on a color of the coin included in the ellipse detection frame.

In the embodiment of the present application, a large number of coins can be determined at the same time in a very short time. As the coin identification technology based on deep learning is applied, the technical problem of the waste in labor costs and slow counting of coins by manual counting coins is overcome, thereby achieving the technical effect of simultaneously identifying and determining a large number of coins in a short time.

Figure 4:
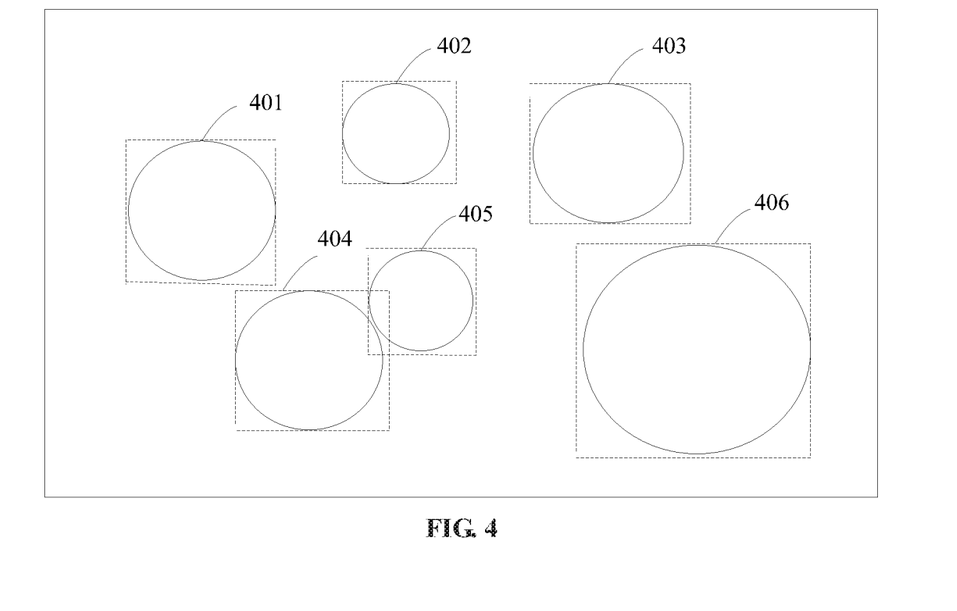
FIG. 4 is a scene diagram of detecting a coin according to an embodiment of the present application.

FIG. 4 is a scene diagram of detecting a coin according to an embodiment of the present application. Here, 401, 403, and 404 are coins with a medium face value, 406 is a coin with a large face value, and 402 and 405 are coins with a small face value. The position of each coin in the image is detected by using the coin detection model. The position of the coin can be marked with a square or a rectangle. Herein, the positions 404 and 405 are next to each other, and the marked position has an overlapped part.

Figure 5:
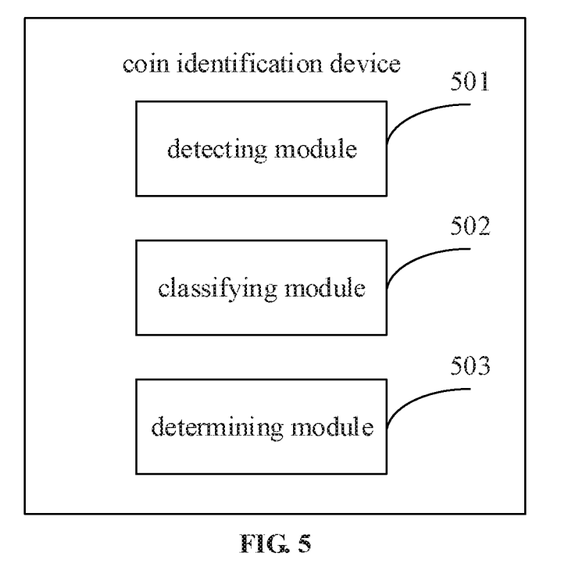
FIG. 5 is a schematic block diagram of a coin identification device according to an embodiment of the present application.

FIG. 5 is a schematic block diagram of a coin identification device according to an embodiment of the present application. The device includes a detecting module 501, a classifying module 502, and a determining module 503.

a detecting module 501 configured to extract, from a to-be-identified image comprising coins, image blocks corresponding to the coins, to form an input coin set;

a classifying module 502 configured to input the input coin set into a coin classification model, to obtain categories and a classification confidences of the image blocks of the coins in the input coin set, wherein the category comprises a face value of the coin; and a determining module 503 configured to incorporate an image block, with a classification confidence reaching a threshold, of a coin of the input coin set into a first coin set; and determine a face value indicated by a category of the image block of the coin in the first coin set as a final face value of the coin in the first coin set.

Figure 6:
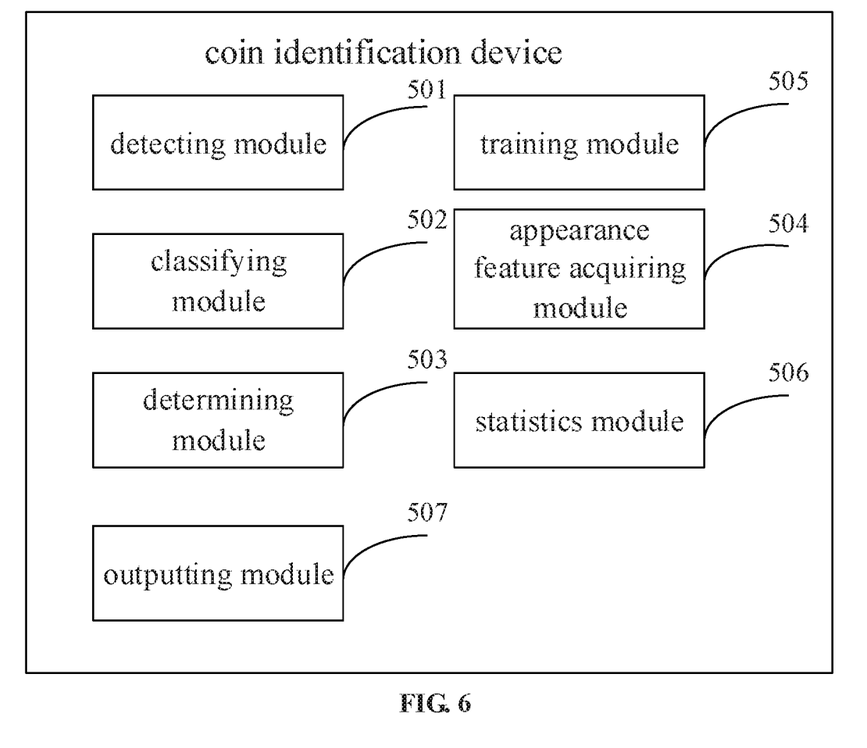
FIG. 6 is a schematic block diagram of a coin identification device according to an embodiment of the present application.

In an embodiment, as shown in FIG. 6, the coin identification device further includes:

an appearance feature acquiring module 504 configured to acquire an appearance feature for each face value of coins in the first coin set;

wherein the determining module 503 is further configured to, for each coin to be identified in the second coin set, compare the image block of the coin in the second coin set with the appearance feature for each face value of coins in the first coin set, to determine a final face value of the coin in the second coin set.

In an embodiment, the category in the classifying module 502 further comprises an upward side; the determining module is further configured to incorporate an image block of a coin with a first upward side of the input coin set into the first coin set, wherein the image block of the first coin set has the classification confidence reaching the threshold.

In an embodiment, the appearance feature comprises information on a diameter and/or a color, and the determining module 503 comprises at least one of;

a first determining sub-module configured to, for an image block of each coin to be identified with the first upward side in the second coin set, determine a face value of an image block of a coin, having a diameter difference with the image block of the coin to be identified less than a first threshold, in the first coin set; and/or determine a face value of an image block of a coin, having a color difference with the image block of the coin to be identified less than a second threshold; and determine the face value as the final face value of the coin to be identified; and a second determining sub-module configured to, for an image block of each coin to be identified having a second upward side in the second coin set, determine a first face value of an image block having a diameter difference with the image block of the coin to be identified less than a third threshold, in the first coin set; and a second face value of an image block having a color difference with the image block of the coin to be identified less than a fourth threshold, in the first coin set; and if the first face value is equal to the second face value, determine the first face value as the final face value of the coin to be identified.

In an embodiment, the detecting module 501 is further configured to extract n image blocks from the to-be-identified image comprising n coins, to form the input coin set, wherein one image block corresponds to one coin in the to-be-identified image, and n is a positive integer.

In an embodiment, the coin identification device further includes:

a training module 505 configured to train a coin detection model by using a target detection model:

wherein the detecting module 501 is further configured to input the to-be-identified image into the coin detection model, and detect positions of multiple detection frames and a confidence for each detection frame comprising a coin, and according to the positions of multiple detection frames and the confidence for each detection frame comprising a coin, acquire positions of n detection frames, each of which is determined to comprise a coin; and extract n image blocks from the to-be-identified image according to the positions of the n detection frames.

In an embodiment, the appearance feature acquiring module 504 is configured to perform ellipse fitting on a detection frame for each coin, to acquire an ellipse detection frame; and calculate a diameter of the ellipse detection frame as information on a diameter of the coin, and/or a color average in the ellipse detection frame as information on a color of the coin.

In an embodiment, the appearance feature acquiring module 504 is configured to calculate a diameter average and/or a color average of one or more coins for each face value in the first coin set as information on a diameter and/or a color corresponding to the face value.

In an embodiment, the coin identification device further includes a statistics module 506 configured to, according to the final face value of each of the coins in the input coin set, determine a total face value and/or a number of all coins in the input coin set by statistics.

In an embodiment, the coin identification device further includes an outputting module 507 configured to output information of the coins in an image form; wherein the information of the coins comprises at least one of a position of each coin, a face value of each coin, a classification confidence of each coin, a total face value of the coins, and a number of the coins.

Optionally, the total face value of the coins and whether the settlement is successful are prompted in the form of a sound In this embodiment, functions of units in the coin identification device refer to the corresponding description of the above mentioned method and thus the description thereof is omitted herein.

According to an embodiment of the present application, the present application further provides an electronic apparatus and a readable storage medium.

Figure 7:
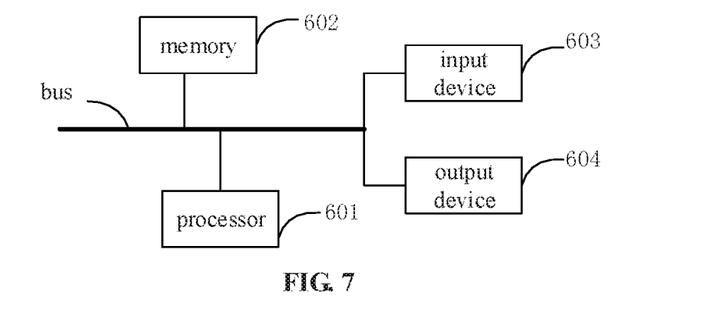
FIG. 7 is a block diagram of an electronic apparatus used to implement a coin identification method in an embodiment of the present application.

As shown in FIG. 7, it is a block diagram of an electronic apparatus according to the coin identification method according to the embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital processing, cellular phones, intelligent phones, wearable devices, and other similar computing devices. The components shown here, their connections and relationships, and their functions are merely examples, and are not intended to limit the implementation of the application described and/or required herein.

As shown in FIG. 7, the electronic apparatus includes: one or more processors 601, a memory 602, and interfaces for connecting various components, including a high-speed interface and a low-speed interface. The various components are interconnected using different buses and can be mounted on a common motherboard or otherwise installed as required. The processor may process instructions executed within the electronic apparatus, including storing in or on a memory to display a graphical user interface (GUI) on an external input/output device such as a display device coupled to the interface) Graphic information instructions. In other embodiments, multiple processors and/or multiple buses can be used with multiple memories and multiple memories, if desired. Similarly, multiple electronic apparatus can be connected, each providing some of the necessary operations (for example, as a server array, a group of blade servers, or a multiprocessor system). A processor 601 is taken as an example in FIG. 7.

The memory 602 is a non-transitory computer-readable storage medium provided by the present application. The memory stores instructions executable by at least one processor, so that the at least one processor executes the coin identification method provided in the present application. The non-transitory computer-readable storage medium of the present application stores computer instructions, which are used to cause a computer to execute the coin identification method provided by the present application.

As a non-transitory computer-readable storage medium, the memory 602 can be used to store non-transitory software programs, non-transitory computer executable programs, and modules, such as a program instruction/module/unit corresponding to the character identification method in the embodiments of the present application. The processor 601 executes various functional applications and data processing of the server by running non-transitory software programs, instructions, and modules stored in the memory 602, that is, the coin identification method in the embodiments of the foregoing method can be implemented.

The memory 602 may include a storage program area and a storage data area, where the storage program area may store an operating system and an application program required for at least one function; the storage data area may store data created according to the use of the electronic device of the coin identification method, etc. In addition, the memory 602 may include a high-speed random access memory, and may also include a non-transitory memory, such as at least one magnetic disk storage device, a flash memory device, or other non-transitory solid-state storage device. In some embodiments, the memory 602 may optionally include a memory remotely set relative to the processor 601, and these remote memories may be connected to the electronic apparatus with the coin identification method through a network. Examples of the above network include, but are not limited to, the Internet, an intranet, a local area network, a mobile communication network, and combinations thereof.

The electronic apparatus with the coin identification method may further include an input device 603 and an output device 604. The processor 601, the memory 602, the input device 603, and the output device 604 may be connected through a bus or in other manners. In FIG. 7, the connection through the bus is taken as an example.

The input device 603 can receive inputted numeric or character information, and generate key signal inputs related to user settings and function control of an electronic apparatus for coin identification method, such as a touch screen, a keypad, a mouse, a trackpad, a touchpad, a pointing stick, one or more mouse buttons, a trackball, a joystick and other input devices. The output device 604 may include a display device, an auxiliary lighting device (for example, an LED), a haptic feedback device (for example, a vibration motor), and the like. The display device may include, but is not limited to, a liquid crystal display (Liquid Crystal Display, LCD), a light emitting diode (Light Emitting Diode, LED) display, and a plasma display. In some embodiments, the display device may be a touch screen.

Various implementations of the systems and technologies described herein can be implemented in digital electronic circuit systems, integrated circuit systems, application specific integrated circuits (ASICs), a computer hardware, a firmware, a software, and/or combinations thereof. These various embodiments may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, software, software applications, or codes) include machine instructions of a programmable processor and can be implemented using high-level procedural and/or object-oriented programming languages, and/or assembly/machine languages. As used herein, the terms "machine-readable medium" and "computer-readable medium" refer to any computer program product, device, and/or device used to provide machine instructions and/or data to a programmable processor (for example, magnetic disks, optical disks, memories, and programmable logic devices (PLD)), include machine-readable media that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a CRT (Cathode Ray Tube) or LCD (liquid crystal display) monitor) for displaying information to the user; and a keyboard and pointing device (such as a mouse or trackball) through which the user can provide input into a computer. Other kinds of devices may also be used to provide interaction with the user; for example, the feedback provided to the user may be any form of sensory feedback (for example, visual feedback, auditory feedback, or haptic feedback); and may be in any form (including acoustic input, voice input, or tactile input) to receive input from the user.

The systems and technologies described herein can be implemented in a subscriber computer of a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including such background components, middleware components, or any combination of front-end components. The components of the system may be interconnected by any form or medium of digital data communication (such as, a communication network). Examples of communication networks include: a local area network (LAN), a wide area network (WAN), and the Internet.

Computer systems can include clients and servers. The client and server are generally remote from each other and typically interact through a communication network. The client-server relationship is generated by computer programs running on the respective computers and having a client-server relationship with each other.

Figure 8:
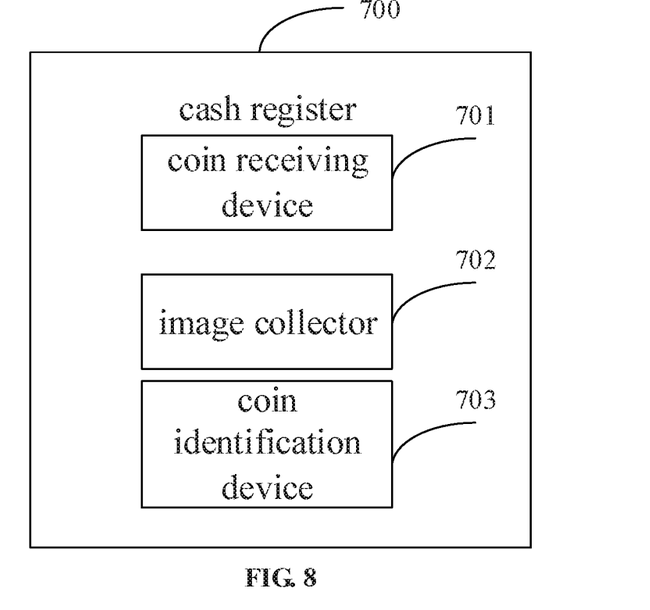
FIG. 8 is a schematic block diagram of a cash register that is used to implement a coin identification method in an embodiment of the present application.

FIG. 8 is a schematic block diagram of a cash register that is used to implement a coin identification method in an embodiment of the present application. The cash register 700 includes a coin receiving device 701, an image collector 702, and a coin identification device 703.

The coin receiving device 701 is configured to receive inserted coins. When the user checks out, the coin receiving device 701 is ejected, and the user lays the coin flatly in the device.

In an embodiment, the user inserts a coin into the coin receiving device 701, and the coin receiving device 701 lays the coins flatly.

The image collector 702 is configured to acquire a to-be-identified image including n coins inserted. The image collector 702 may use one or more cameras and high-definition cameras.

A coin identification device 703 including: at least one processor; and a memory communicated with the at least one processor; instructions executable by the at least one processor is stored in the memory, and the instructions are executed by the at least one processor to enable the at least one processor to implement the coin identification method.

In one embodiment, the cash register 700 may be embedded in a scenario that requires automatic counting of coins, such as self-service supermarkets, a vending machine, and self-service containers.

In one embodiment, the cash register 700 may also be used as a coin counting tool to calculate face values of a large number of coins. The plurality of image collectors 702 may be used to collect images of coins, and the coin identification device 703 performs automatic counting.

According to the technical solution of the embodiment of the present application, the effect of high identification accuracy is achieved in a fixed scenario of a checkout counter. Manual counting by the salesperson is not required in the process; at the same time, full currency identification is also supported. A large number of coins can be determined at the same time in a very short time. Further, it can be applied to or embedded in the cash register system of the self-service supermarket or the vending machine to cover the coin-level payment scenario of the user. As the coin identification technology based on deep learning is adopted, the technical problems are overcome, such as a waste in labor costs by manually counting coins, less categories of the coins supported by a coin system, and a long time for inserting coins, thereby achieving an effect of supporting full currency identification and determining a large number of coins at the same time in a very short time.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific implementation manners do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A coin identification method, comprising:
    extracting, from a to-be-identified image comprising coins, image blocks corresponding to the coins, to form an input coin set;
    inputting the input coin set into a coin classification model, to obtain categories and a classification confidences of the image blocks of the coins in the input coin set, wherein a category comprises a face value of a coin;
    incorporating an image block, with a classification confidence reaching a threshold, of the coin of the input coin set into a first coin set; and
    determining a face value indicated by the category of the image block of the coin in the first coin set as a final face value of the coin in the first coin set.

2. The coin identification method according to claim 1, further comprising:
    incorporating an image block, except the image block of the coin of the first coin set, of the coin of the input coin set into a second coin set;
    acquiring an appearance feature for each face value of coins in the first coin set; and
    for each coin to be identified in the second coin set, comparing the image block of the coin in the second coin set with the appearance feature for each face value of coins in the first coin set, to determine a final face value of the coin in the second coin set.

3. The coin identification method according to claim 2, wherein the category further comprises an upward side;

the incorporating an image block, with a classification confidence reaching a threshold, of a coin of the input coin set into a first coin set comprises:

incorporating an image block of a coin with a first upward side of the input coin set into the first coin set, wherein the image block of the first coin set has the classification confidence reaching the threshold.

4. The coin identification method according to claim 3, wherein the appearance feature comprise information on a diameter and/or a color, and the for each coin to be identified in the second coin set, comparing the image block of the coin in the second coin set with the appearance feature for each face value of coins in the first coin set, to determine a final face value of the coin in the second coin set comprises at least one of:

for an image block of each coin to be identified with the first upward side in the second coin set, determining a face value of an image block of a coin, having a diameter difference with the image block of the coin to be identified less than a first threshold, in the first coin set; and/or determining a face value of an image block of a coin, having a color difference with the image block of the coin to be identified less than a second threshold; and determining the face value as the final face value of the coin to be identified; and for an image block of each coin to be identified having a second upward side in the second coin set, determining a first face value of an image block having a diameter difference with the image block of the coin to be identified less than a third threshold, in the first coin set; and a second face value of an image block having a color difference with the image block of the coin to be identified less than a fourth threshold, in the first coin set; and if the first face value is equal to the second face value, determining the first face value as the final face value of the coin to be identified.

5. The coin identification method according to claim 1, wherein the extracting, from a to-be-identified image comprising coins, image blocks corresponding to the coins, to form an input coin set comprises:

extracting n image blocks from the to-be-identified image comprising n coins, to form the input coin set, wherein one image block corresponds to one coin in the to-be-identified image, and n is a positive integer.

6. The coin identification method according to claim 5, further comprising: training a coin detection model by using a target detection model, the extracting n image blocks from the to-be-identified image comprising n coins comprises:

inputting the to-be-identified image into the coin detection model, and detecting positions of multiple detection frames and a confidence for each detection frame comprising a coin;

according to the positions of multiple detection frames and the confidence for each detection frame comprising a coin, acquiring positions of n detection frames, each of which is determined to comprise a coin; and extracting n image blocks from the to-be-identified image according to the positions of the n detection frames.

7. The coin identification method according to claim 6, further comprising:

performing ellipse fitting on a detection frame for each coin, to acquire an ellipse detection frame; and calculating a diameter of the ellipse detection frame as information on a diameter of the coin, and/or a color average in the ellipse detection frame as information on a color of the coin.

8. The coin identification method according to claim 2, wherein the acquiring an appearance feature for each face value of coins in the first coin set comprises:

calculating a diameter average and/or a color average of one or more coins for each face value in the first coin set as information on a diameter and/or a color corresponding to the face value.

9. The coin identification method according to claim 1, further comprising:

according to the final face value of each of the coins in the input coin set, determining a total face value and/or a number of all coins in the input coin set by statistics.

10. The coin identification method according to claim 1, further comprising:

outputting information of the coins in an image form;

wherein the information of the coins comprises at least one of a position of each coin, a face value of each coin, a classification confidence of each coin, a total face value of the coins, and a number of the coins.

11. A coin identification device, comprising:

one or more processors; and a storage device configured for storing one or more programs, wherein the one or more programs are executed by the one or more processors to enable the one or more processors to:

extract, from a to-be-identified image comprising coins, image blocks corresponding to the coins, to form an input coin set;

input the input coin set into a coin classification model, to obtain categories and a classification confidences of the image blocks of the coins in the input coin set, wherein a category comprises a face value of a coin; and incorporate an image block, with a classification confidence reaching a threshold, of the coin of the input coin set into a first coin set; and determine a face value indicated by the category of the image block of the coin in the first coin set as a final face value of the coin in the first coin set.

12. The coin identification device according to claim 11, wherein the one or more programs are executed by the one or more processors to enable the one or more processors further to:

acquire an appearance feature for each face value of coins in the first coin set; and for each coin to be identified in the second coin set, compare the image block of the coin in the second coin set with the appearance feature for each face value of coins in the first coin set, to determine a final face value of the coin in the second coin set.

13. The coin identification device according to claim 12, wherein the category further comprises an upward side; and the one or more programs are executed by the one or more processors to enable the one or more processors further to:

incorporate an image block of a coin with a first upward side of the input coin set into the first coin set, wherein the image block of the first coin set has the classification confidence reaching the threshold.

14. The coin identification device according to claim 13, wherein the appearance feature comprises information on a diameter and/or a color, and the one or more programs are executed by the one or more processors to enable the one or more processors further to execute at least one of:

for an image block of each coin to be identified with the first upward side in the second coin set, determine a face value of an image block of a coin, having a diameter difference with the image block of the coin to be identified less than a first threshold, in the first coin set; and/or determine a face value of an image block of a coin, having a color difference with the image block of the coin to be identified less than a second threshold; and determine the face value as the final face value of the coin to be identified; and for an image block of each coin to be identified having a second upward side in the second coin set, determine a first face value of an image block having a diameter difference with the image block of the coin to be identified less than a third threshold, in the first coin set; and a second face value of an image block having a color difference with the image block of the coin to be identified less than a fourth threshold, in the first coin set; and if the first face value is equal to the second face value, determine the first face value as the final face value of the coin to be identified.

15. The coin identification device according to claim 11, wherein the one or more programs are executed by the one or more processors to enable the one or more processors further to:

extract n image blocks from the to-be-identified image comprising n coins, to form the input coin set, wherein one image block corresponds to one coin in the to-be-identified image, and n is a positive integer.

16. The coin identification device according to claim 15, wherein the one or more programs are executed by the one or more processors to enable the one or more processors further to:

train a coin detection model by using a target detection model;

input the to-be-identified image into the coin detection model, and detect positions of multiple detection frames and a confidence for each detection frame comprising a coin, and according to the positions of multiple detection frames and the confidence for each detection frame comprising a coin, acquire positions of n detection frames, each of which is determined to comprise a coin; and extract n image blocks from the to-be-identified image according to the positions of the n detection frames.

17. The coin identification device according to claim 16, wherein the one or more programs are executed by the one or more processors to enable the one or more processors further to perform ellipse fitting on a detection frame for each coin, to acquire an ellipse detection frame; and calculate a diameter of the ellipse detection frame as information on a diameter of the coin, and/or a color average in the ellipse detection frame as information on a color of the coin.

18. The coin identification device according to claim 12, wherein the one or more programs are executed by the one or more processors to enable the one or more processors further to calculate a diameter average and/or a color average of one or more coins for each face value in the first coin set as information on a diameter and/or a color corresponding to the face value.

19. The coin identification device according to claim 11, wherein the one or more programs are executed by the one or more processors to enable the one or more processors further to:

output information of the coins in an image form;

wherein the information of the coins comprises at least one of a position of each coin, a face value of each coin, a classification confidence of each coin, a total face value of the coins, and a number of the coins.

20. A non-transitory computer-readable storage medium, storing a computer executable instructions stored thereon, that when executed by a processor cause the processor to perform operations comprising:

extracting, from a to-be-identified image comprising coins, image blocks corresponding to the coins, to form an input coin set;

inputting the input coin set into a coin classification model, to obtain categories and a classification confidences of the image blocks of the coins in the input coin set, wherein a category comprises a face value of a coin;

incorporating an image block, with a classification confidence reaching a threshold, of the coin of the input coin set into a first coin set; and determining a face value indicated by the category of the image block of the coin in the first coin set as a final face value of the coin in the first coin set.

* * * * *